(12) United States Patent
Mickeleit et al.

(10) Patent No.: US 10,395,148 B2
(45) Date of Patent: Aug. 27, 2019

(54) METHOD FOR TRANSMITTING PRINT DATA, SERVER AND MOBILE TERMINAL

(71) Applicant: Cortado AG, Berlin (DE)

(72) Inventors: Carsten Mickeleit, Berlin (DE); Bernd Trappe, Hoppegarten Ot Birkenstein (DE)

(73) Assignee: CORTADO AG, Berlin (DE)

( * ) Notice: Subject to any disclaimer, the term of this patent is extended or adjusted under 35 U.S.C. 154(b) by 0 days.

(21) Appl. No.: 15/968,190

(22) Filed: May 1, 2018

(65) Prior Publication Data

US 2018/0247167 A1   Aug. 30, 2018

Related U.S. Application Data

(62) Division of application No. 14/929,750, filed on Nov. 2, 2015, now Pat. No. 9,971,961.

(30) Foreign Application Priority Data

Oct. 31, 2014 (DE) .................. 10 2014 115 900
Dec. 19, 2014 (DE) .................. 10 2014 226 625

(51) Int. Cl.
*G06K 15/02* (2006.01)
*H04N 1/00* (2006.01)
*G06F 3/12* (2006.01)
*H04N 1/32* (2006.01)

(52) U.S. Cl.
CPC .......... *G06K 15/02* (2013.01); *G06F 3/1204* (2013.01); *G06F 3/1222* (2013.01); *G06F 3/1236* (2013.01); *G06F 3/1239* (2013.01); *G06F 3/1288* (2013.01); *H04N 1/00204* (2013.01); *H04N 1/00244* (2013.01); *H04N 1/32523* (2013.01)

(58) Field of Classification Search
CPC ..................................................... G06K 15/02
USPC ........................................................ 358/1.15
See application file for complete search history.

(56) References Cited

U.S. PATENT DOCUMENTS

2002/0181022 A1* 12/2002 Tokashiki .......... H04N 1/32502
                                                                358/1.18
2004/0239986 A1* 12/2004 Wise ...................... G06F 3/122
                                                                358/1.15
(Continued)

FOREIGN PATENT DOCUMENTS

EP      1471418 A2 * 10/2004  ............. G06F 3/122
EP      1471418 A2    10/2004
(Continued)

*Primary Examiner* — Jacky X Zheng
(74) *Attorney, Agent, or Firm* — Fox Rothschild LLP

(57) ABSTRACT

The invention relates to a method for transmitting print data, a server (120) and a mobile terminal (100). The invention further relates to a corresponding computer-readable storage medium. In the method, steps are carried out which include receiving the print job, conversion into the printer-specific format, saving the printer-specific format on another server (130), informing the mobile terminal (100) of the completed conversion, reporting the completed conversion to the user and, after confirmation from the user, transmitting the print data to the mobile terminal (100), in order to forward the print data in a last step to a printer (200) connected to the mobile terminal (100).

6 Claims, 1 Drawing Sheet

(56) References Cited

U.S. PATENT DOCUMENTS

2011/0185398 A1* 7/2011 Kubota .................. G06F 21/41
                                                    726/3
2012/0243041 A1* 9/2012 Sakurai ................ G06F 3/1208
                                                    358/1.15
2013/0128306 A1   5/2013 Takahashi
2015/0116755 A1* 4/2015 Hayakawa ............ G06F 3/1288
                                                    358/1.14

FOREIGN PATENT DOCUMENTS

EP        1712986 A2    10/2006
EP        1471418 A3 *  12/2006  ............. G06F 3/122
WO     2010128339 A2    11/2010

* cited by examiner

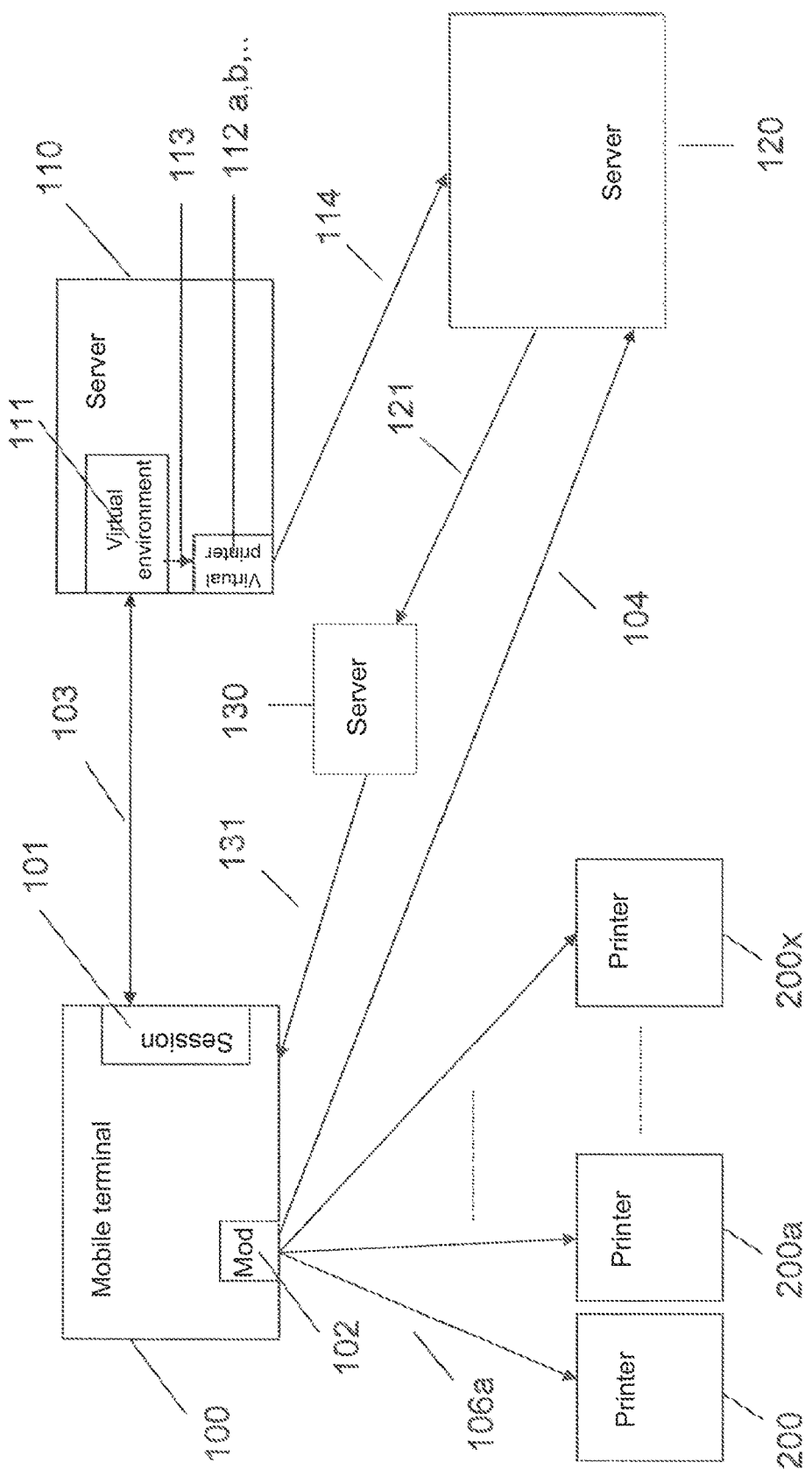

METHOD FOR TRANSMITTING PRINT DATA, SERVER AND MOBILE TERMINAL

CROSS-REFERENCE TO RELATED APPLICATIONS

The present application is a divisional application which claims priority to U.S. patent application Ser. No. 14/929,750, filed on Nov. 2, 2015, which claims priority to German Patent Application No. 10 2014 115 900.4 filed Oct. 31, 2014, which claims priority to German Patent Application No. 10 2014 226 625.4 filed Dec. 19, 2014, the contents of all of which are incorporated by reference in their entirety as if fully set forth herein.

TECHNICAL FIELD

The invention relates to a method for transmitting print data, a server and a mobile terminal. The invention further relates to a corresponding computer-readable storage medium.

BACKGROUND

Terminal server applications whose extended variants are also known as virtual desktop applications (VD applications), make it possible to centralize required hardware at one location or only a few locations, such as data centers, since only standardized hardware providing the necessary input/output means is required at the terminals. This allows, inter alia, centralizing management of the application, data processing and data protection. Hardware defects at the terminal do not affect the application and all terminals operate with the same version of the application.

The proliferation of mobile terminals with mobile data links makes it possible to use the mobile terminals, for example a tablet computer or a mobile phone, as a terminal.

When a VD session is started and executed on the terminal, the user has access only to the applications and data residing on the VD-Server. Local applications, i.e. applications installed on the terminal, cannot access the data on the server and applications installed on the VD-Server cannot access data stored on the terminal, for example on the mobile terminal. The only resources of the mobile terminal, which the user can use as part of the session, are those the user needs for controlling this session. These are, for example, a keyboard that can be virtually displayed on the screen or that may actually be physically present, the display screen and a pointing device, typically a mouse or a touch screen. Other resources are not available to the user as part of the session.

If in the context of the application, the user wants to print modified or generated data, then the user must have access to a printer connected to the server, for which the application, the data are processed for printing subsequent to a print request by the user, thereby generating print data that the server may then forward to the printer.

One or more printers may have been set up for the user in the VD session. These are printers located on the corporate network. The user is advantageously at his workplace. However, if the user is traveling with his mobile terminal outside the company premises, he can no longer use these printers. If the user wants to print a document that is accessible only via the closed network, multiple steps are required; if only one of these steps fails, the user cannot print the document. In the first step, the user must copy the document from the corporate network onto his mobile terminal. From there, the document is sent to the printer, with the assumption that the document is in the correct print data format. The user can evaluate this only when he has the actual print in hand. Since he has no other support, he must convert the document to the proper format in the corporate network. This task is usually handled by the printer driver, which subsequently forwards the converted document to the printer. No provision for user intervention is made at the point. The user must therefore interrupt the usual printing process to gain access to the print data. It is hence obvious that in the prior art a user who performs a VD-session on a server via a mobile terminal and a mobile data connection faces major problems when outputting one of the documents stored on the server on a locally available printer.

Mobile terminals, on which, for example, the operating system iOS or Android is installed, are equipped with the functionality to be contacted by a notification server, which provides the necessary infrastructure to contact and to send data to the mobile terminals via a unique ID regardless of existing network topologies. This is strictly a one-way communication from the notification server to the mobile terminal.

In the conventional process, the user starts a print job by operating the user interface of the employed application on the VD-Server. This usually involves selecting the menu item "Print" or directly pressing a button. A few more steps are still possible thereafter, such as selecting the desired printer, when several printers are installed, and setting parameters for the print job, for example, the paper size or two-sided printing. Thereafter, the print job on the server is forwarded to the printer driver of the selected printer, which converts the data into the required format and forwards the data to the printer. This procedure is not practical for mobile terminals located outside of the network, since the user has no access to the printer and hence cannot access the actual print.

SUMMARY OF THE INVENTION

The inventors have found a method for transmitting print data that facilitates the printing of data for the user. The invention is intended to allow a user to send a print job from a session to a locally connected printer. It is the object of the invention to make the printers installed on this mobile terminal available to the user of a VD session during the VD session.

According to the invention, a method for transmitting print data is presented. According to the invention, a server and a mobile terminal are also provided.

The method according to the invention includes the following steps: registering a mobile terminal in an application executed on a server and/or transmitting an ID of the mobile terminal in the context of a structure of a session of the application, wherein the application is unable to access data stored locally on the mobile terminal; controlling the application to generate data to be stored on the server or to modify data stored on the server by a user of the mobile terminal; initiating a print job for the data from within the application by the user; forwarding the print job to a virtual printer installed on the server; generating with the virtual printer the print data from the data; storing the print data; notifying the mobile terminal that the print data are stored; establishing with the mobile terminal a connection from the mobile terminal to the server; and forwarding the print data via the mobile terminal from the server to a printer communicating with the mobile terminal.

On the server according to the invention an application is stored, which is configured to display on a screen of a mobile terminal a graphic user interface for the application and to be controlled from the mobile terminal via a keyboard and/or a pointing device for generating data to be stored on the server or for modifying data stored on the server. The application cannot access data that are stored locally on the mobile terminal. The application is configured to be controlled by the mobile terminal so that print data are generated from the data on the server based from within the application. The server is characterized in that the print data are generated for printing on a printer connected or connectable to the mobile terminal, and that the mobile terminal is notified by the server of the availability of the print data after the print data are generated.

The mobile terminal according to the invention includes a keyboard and/or a pointing device for controlling an application executed on a server for generating data to be stored on the server or for modifying data stored on the server. The application cannot access data that are stored locally on the mobile terminal. The mobile terminal is configured to query the print data from the server or from another server in response to a notification of the availability of print data generated from the data on the server and to forward them to a printer.

In a preferred embodiment of the server, a virtual printer is installed on the server, which is configured to generate from the data the print data in PDF format, in PCL format and/or in PostScript format.

The print data can be supplemented with additional information related to printing. The print data can be stored on another server, and the mobile terminal can also be notified via an address of the other server.

In a preferred embodiment of the mobile terminal, the mobile terminal is configured to query a confirmation from a user in response to the notification, before the print data are queried from the server and forwarded to the printer. The user may be given the opportunity within the context of the confirmation to select the printer from a list of printers and/or to modify at least one print setting.

When the application is called, the mobile terminal can perform a registration on the server and/or transmit an ID of the mobile terminal to the server and the mobile terminal can be informed of the availability of the print data based on the registration or the transmitted ID of the mobile terminal.

The mobile terminal may be configured to query the print data from another server, wherein a predetermined address of the other server may be stored in the mobile terminal or may be included in the notification.

According to the invention, a computer readable storage medium is lastly also proposed on which an application and/or a module are stored. The application is hereby configured to be executed on a server and to subsequently display on a screen of a mobile terminal a graphic user interface for the application and to be controlled by the mobile terminal via a keyboard and/or a pointing device for generating data to be stored on the server or for modifying data stored on the server. The application cannot access data that are stored locally on the mobile terminal. The application is configured to be controlled, when executed by a server, from a mobile terminal in such a way that print data can be generated on the server from the data for printing on a printer connected or connectable to the mobile terminal from within the application, and that the mobile terminal can be notified by the server of the availability of the print data after the print data are generated. The module is configured to query the print data from the server or from another server when executed on a mobile terminal in response to a notification of availability of print data generated from the data on a server and to forward the print data to a printer connected to the mobile terminal.

According to the invention, an infrastructure with a notification server can be used so that a module installed on the mobile terminal responds to a specific message from the notification server so as to query the print data from the server and to forward the print data to the printer.

Advantageous embodiments of the invention are recited in the dependent claims and described in the specification.

DRAWING

Embodiments of the invention will now be described in more detail with reference to the drawing and the following description, wherein:

FIG. 1 shows schematically and by way of example a process flow of the method according to the invention.

Embodiments of the invention relate to a method for the transmission of print data, components, and an arrangement for the realization of the method, a corresponding computer program and a corresponding computer-readable storage medium (computer program product) on which the computer program is stored. In particular, the method makes it possible to print from a terminal server session or a virtual desktop session, which is controlled by an optionally mobile terminal, data generated and/or modified in the context of the application, for example a document, on a printer that is connected to the mobile terminal. Examples of mobile terminals are tablet computers and smartphones.

The proliferation of mobile terminals and mobile data connections makes it possible to set up such a session on a tablet computer or even on a mobile phone. The particular advantage of virtual desktops on these devices lies in the strict separation of data and applications.

In particular, however, locally installed printers are not directly accessible to the application, when the user wants to print from the session, because the server has no knowledge of the printers connected to the mobile terminal. Thus, printers connected to the mobile terminal cannot be installed on the server. The application can directly access only centrally installed printers, such as printers that reside on the corporate network and that can be addressed via the server. However, these printers are not usable, if the mobile terminal is not located within the corporate network.

In an exemplary embodiment of the invention, a virtual printer is therefore created on the server. This printer is configured to accept a print job for data stored on the server and to convert the data into print data.

For example, the print data are generated in PDF format, because this format must run on all printers that connect with the mobile terminal via the AirPrint protocol. However, print data may also be generated in a different printable format, for example, in PCL format or in PostScript format. These two formats are advantageously supported by a large number of printers. In other embodiments of the invention, other print data formats are generated. After the print data have been generated, they are stored on the server or on another server for later access.

The server or the other server can keep a list of mobile terminals. When several mobile terminals are active on the server, a notification server can be informed, based on the list, as to which mobile terminal should be informed of the storage of generated print data. The server then informs the respective mobile terminal that the print data have been stored.

For this purpose, for example notification mechanisms can be used that are standard on the mobile terminal. For example, the APN-service ("Apple Push Notification") can be used in mobile terminals based on the operating system iOS to transmit the notification to the mobile terminal. The notification is received by a module installed on the mobile terminal. The module can establish a connection to the server, which has stored the print data, in order to transmit the print data to the mobile terminal and forward the print data to a printer connected to the mobile terminal. The module can optionally display a message on a graphic user interface of the mobile terminal before transmitting the print data. The transmission may also require a prior confirmation by the user of the mobile terminal. The module may then also prompt the user for this confirmation in the message. The user may additionally or alternatively have the option to select a printer and/or to change print settings.

The print data can optionally be supplemented with information that goes beyond the pure print data. Since the module on the mobile terminal receives the data and forwards the data to the printer, the additionally generated information can be read and additional steps can be performed based on this additional information. This may concern simple things, such as limiting the selection of the printer or set specific printer settings. Further actions are also possible, such as for example opening a dialogue to display additional information to the user. This should serve only as an example, since in principle any operation that is technically feasible on the mobile terminal can be triggered or influenced by the additional information.

FIG. 1 shows schematically in form of an example a process flow of an embodiment of the method according to the invention. Steps are carried out with the method, which include receiving the print job, performing the conversion into the printer-specific format, saving the printer-specific format on another server, informing the mobile terminal about the completed conversion, reporting the completed conversion to the user, and transmitting the print data to the mobile terminal after confirmation from the user, and then, in the last step, forwarding the print data to the connected printer.

A user has started a VD session 101 on the mobile terminal 100, which is carried out on the server 110 via the connection 103. For this purpose, the server 110 has set up a virtual environment 111, in which the virtual printer 112 a, b, . . . is installed. Only one virtual printer 112 may be installed. The user initiates in the session 101 a print job, which is forwarded to the selected virtual printer 112 via the connection 113. This virtual printer generates the print data for the printer 200. Additional information intended for the module 102 on the mobile terminal 100 can be added. The virtual printer forwards the data via the connection 114 to the server 120, where the data are stored until they are recalled. After complete receipt of the data, the server 120 instructs the notification server 130 via the connection 121 to inform the mobile terminal 100 of the availability of the data. The notification server 130 establishes the connection 131 and transmits the message to the mobile terminal 100. The mobile terminal 100 then sets up a connection 104 to the server 120 and requests the print data. The information that was added to the print data by the printer driver 112 is removed from this data stream. At the end, the print data are sent from the module 102 via the connection 106 a, b, . . . to the printer 200 a, b, . . . .

The server 120 needs information about the mobile terminal to which the notification server is to report the generation of the print data. Several methods are conceivable for this purpose:

The mobile terminal 100 is registered with the server 120 before setting up the session 101.

The ID of the mobile terminal 100 is transmitted by mobile terminal 100 to the VD server 110 at the start of the VD session 101. This ID is transmitted to the server 120 with the transmission of the print data 114.

Conversely, the mobile terminal needs the information about the server on which the print data are stored. Several methods are also conceivable for this purpose:

The server 120 forwards its address to the notification server 130 in step 121, which then transmits this information together with the message to the mobile terminal 100 in step 131.

The address of the server 120 is stored when the module 102 is set up on the mobile terminal 100.

The invention claimed is:

1. A server comprising an virtual desktop, VD, application installed and executed on the server,
    wherein the VD application is configured to display a graphic user interface for the application on a screen of a mobile terminal,
    wherein the VD application is controlled by the mobile terminal by way of keyboard or a pointing device of the mobile terminal
        for generating first data in the context of the VD application to be stored on the server or
        for modifying first data stored on the server in the context of the VD application and
        to generate from the first data on the server from within the VD application print data for printing on the printer,
    wherein the VD application is unable to access second data stored locally on the mobile terminal,
    wherein the server or another server notifies the mobile terminal, after the print data have been generated, that the print data are available for forwarding, via the mobile terminal, to a printer connected to the mobile terminal.

2. The server of claim 1, comprising a virtual printer installed on the server, wherein the virtual printer is configured to generate from the first data the print data in a format selected from PDF, PCL and PostScript.

3. The server of claim 1, wherein the print data are supplemented with additional print-related information.

4. The server of claim 1, wherein the print data are stored on the other server and the mobile terminal is also notified via an address of the other server.

5. The server of claim 1, wherein when the VD application is called, the mobile terminal registers with the server or transmits an ID of the mobile terminal to the server, or both, and the mobile terminal is informed of the availability of the print data based on the registration or the transmitted ID of the mobile terminal.

6. A method for transmitting print data, comprising:
    registering a mobile terminal with a virtual desktop, VD, application executed on a server or transmitting an ID of the mobile terminal in conjunction with setting up a session of the VD application, or both,
    controlling the VD application by a user of the mobile terminal to generate, in the context of the VD application, first data to be stored on the server or to modify, in the context of the VD application, first data stored on the server, wherein the VD application is unable to access second data stored locally on the mobile terminal, initiating by the user a print job for the first data in the VD application, forwarding the print job to a virtual printer installed on the server, generating the print data with the virtual printer from the first data, storing the print data, notifying the mobile terminal that the print data are stored, establishing with the mobile terminal a connection from the mobile terminal to the server, and forwarding the print data from the server via the mobile terminal to a printer connected with the mobile terminal.

* * * * *